Feb. 6, 1945.　　　E. S. TOLMIE　　　2,368,951
SHAVER MOTOR
Filed June 27, 1942　　　3 Sheets-Sheet 1
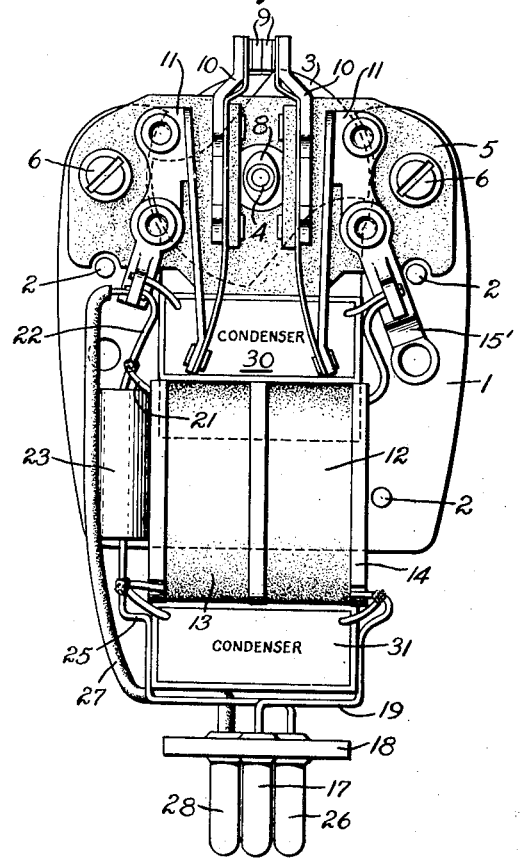
Fig. 1.
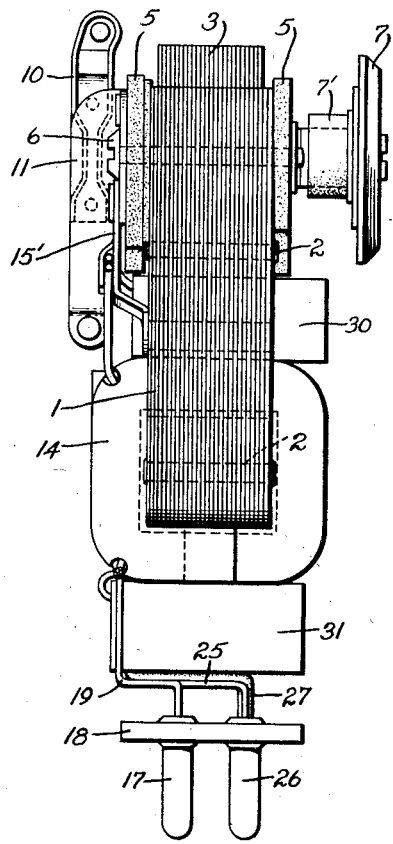
Fig. 2.
Fig. 3.
Inventor
Edgar S. Tolmie
By
Roland T. Booth
Edwin O. Blodgett
Attorneys Inventor
Edgar S. Tolmie

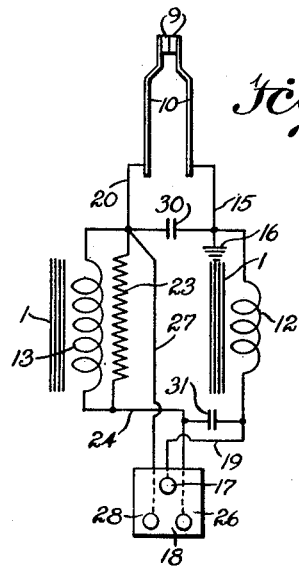
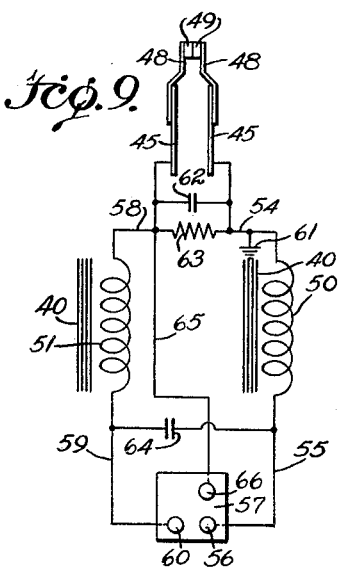
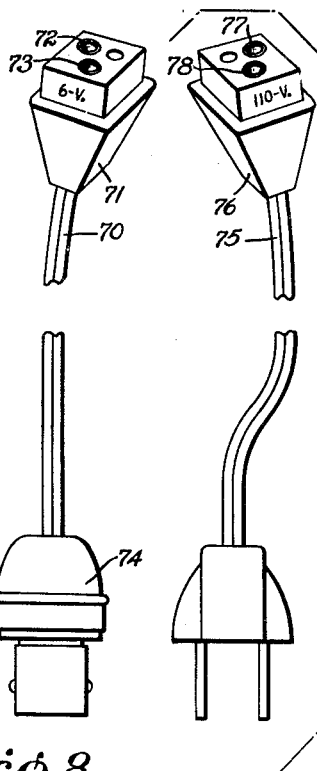
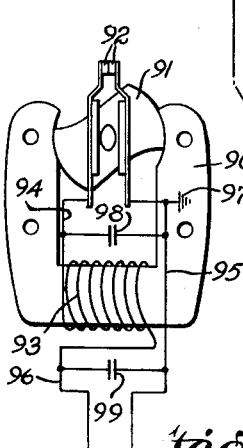

Patented Feb. 6, 1945

2,368,951

UNITED STATES PATENT OFFICE 2,368,951

SHAVER MOTOR

Edgar S. Tolmie, Fairfield, Conn., assignor to Remington Rand Inc., Buffalo, N. Y., a corporation of Delaware Application June 27, 1942, Serial No. 448,608

7 Claims. (Cl. 172—36)

This invention relates to improvements in electric motors, particularly motors of the type designed and used in electric dry shavers although the use of the motor is not limited to shavers.

The invention is directed to improving the construction and operation of these shaver motors in order to increase the power of the motor, without increasing its size, and at the same time reducing arcing at the points, radio intereference and providing for efficient operation of the motor on both high and low voltages without arcing in high voltage circuits during operation on low voltage.

The invention provides for the elimination of a substantial part of the insulating material in the field coil windings of the motor for both single and multiple voltage operation, other than the insulation provided on the wire conductor forming the field windings and the spool structure for supporting the windings, and at the same time eliminating breakdown in the insulation of the coil winding and arcing across the windings normally caused by peak voltages generated upon the break of the contact points of the motor.

The invention also comprehends the construction of multiple voltage motors for use on shavers including means for eliminating arcing in the high voltage winding and breakdown of the insulation caused by high voltage induction in the high voltage winding during operation of the motor with the low voltage winding on low voltage current, together with reduction of arcing at the points to a minimum for the purpose of not only reducing the burning and pitting of the points but also for increasing the efficiency of operation of the motor and its power output.

The invention is also designed to provide radio interference elimination built in the motor structure for both single and multiple voltage motors of the make and break contact type without increasing the size of the motor, and eliminating the necessity of using external separate eliminators connected in the current supply circuit to the motor.

The invention also comprehends the provision of a shaver motor having make and break contacts supported on contact arms that are of thermally responsive material operable to disengage the contacts whenever excessive current is passed through them for the purpose of reducing the likelihood of the coil windings and other parts of the shaver being burned out in case low voltage field winding and its circuit is accidentally plugged into a high voltage current supply circuit.

In the drawings:

Fig. 1 is a plan view of a dual voltage shaver motor embodying the invention.

Fig. 2 is a side elevation of the motor shown in Fig. 1.

Fig. 3 is an end view of the terminal block showing the arrangement of contacts thereon for the motor shown in Figs. 1 and 2.

Fig. 7 is a wiring diagram illustrating the circuit connection for the motor shown in Figs. 1 to 3 inclusive.

Fig. 8 shows a fragmentary portion of an attachment cord illustrating the plug for attachment to the contacts on the terminal block of the motor shown in Figs. 1 to 3 inclusive to illustrate how this motor may be used and connected with a 6 volt or low voltage source of current supply.

Fig. 8A shows a fragmentary illustration in perspective of another plug constructed for connecting the shaver motor of Figs. 1 to 3 in circuit with a high voltage supply source, such as 110 volts.

Fig. 9 is a wiring diagram showing the circuit connections for the shaver motor illustrated in Figs. 4 to 6 inclusive.

Fig. 10 shows a fragment of the attachment cord for the motor shown in Figs. 4 and 5 in perspective, the plug for engagement with the motor terminal block being shown in the position when considered with reference to the terminal block of Fig. 9 for connecting the motor to a current supply of high voltage, such as 220 volts.

Fig. 10A shows a fragment of the attachment cord in a position at right angles to Fig. 10, showing how in relation to the showing of the terminal block in Fig. 9, the shaver motor is connected with a low voltage current supply, such as 110 volts.

Fig. 11 is a wiring diagram showing a motor similar to that shown in Figs. 1 and 4, for example, but having only a single coil winding on the core.

Figure 4:
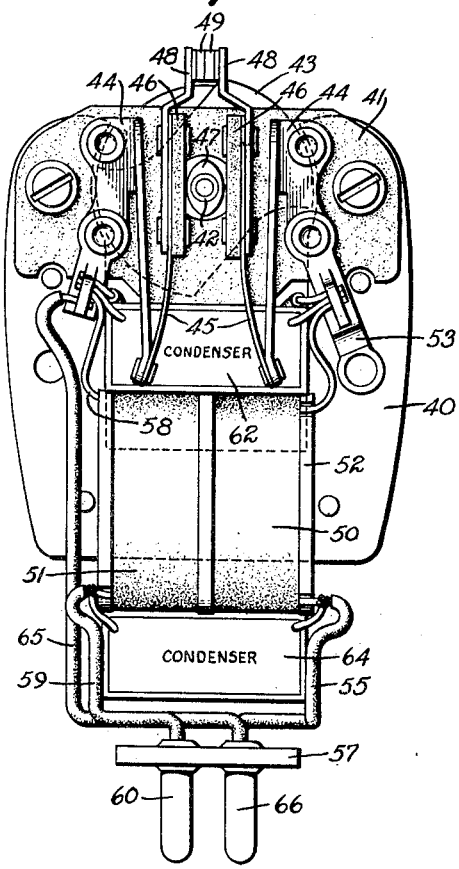
Fig. 4 is a plan view similar to Fig. 1 of a dual voltage shaver motor having thermally responsive contact supporting arms, and designed for dual voltage operation, particularly on 110–220 volt sources of current supply with a contact arrangement on the terminal block different from that shown on Figs. 1 to 3 inclusive.

Referring to Figs. 1, 2, 3 and 7 a motor is shown having a magnetizable core 1. This core is generally U-shaped, as illustrated in Fig. 1, and is made of a plurality of laminations rigidly secured together in any suitable manner, such as by rivets indicated at 2. The free ends of U-shaped core 1 are spaced apart to provide sufficient space for operably receiving rotatable armature 3 carried by shaft 4 rotatably mounted in bearing plates 5 formed of insulating material detachably mounted on the ends of U-shaped core 1 by means of screws 6. Suitable bearing members are carried by bearing plates 5 for rotatably carrying opposite end portions of shaft 4 so that armature 3 is freely rotatable in the space between the poles formed at the ends of core 1.

One end of shaft 4 carries the usual starting wheel 7 and shaver head operating cam carrying insulating roller 7' (dotted lines) while the opposite end of shaft 4 carries an operating cam 8 for separating or disengaging contact points 9 to control the make and break of contact points 9 in the rotation of armature 3. These contact points are supported by suitable contact supporting arms 10 of composite structure attached to supporting brackets 11 carried on one bearing plate 5 at one side of core 1 in the manner illustrated in Figs. 1 and 2. Portions of supporting arms 10 are made of resilient strip material for normally and resiliently moving the contacts into engagement.

This motor is of the dual voltage type and is particularly adapted for alternate operation on 6 and 110 volt current supply circuits, respectively. These voltages are approximate and may be varied as desired. For example, this motor may be constructed so that a low voltage coil winding will operate on voltages from approximately 6 to 24 volts while the high voltage coil winding can be designed for operation on 110 and somewhat higher voltages including voltages up to 120 and higher. The low voltage winding for operation on a 6 volt current supply source is indicated at 12 and the high voltage winding is indicated at 13. These two windings 12 and 13 are wound on a spool 14 divided into two adjacent sections, as illustrated in Fig. 1, so that low voltage winding 12 will be on the right hand section and high voltage winding 13 on the left hand section in the manner clearly illustrated in Fig. 1. It will be noted that these windings 12 and 13 are in adjacent coaxial relation on the central portion of U-shaped core 1.

In order to conserve space in the construction of this motor and at the same time obtain maximum power output it is desirable to eliminate as much insulation as possible in the coil windings in order to prevent the size of the windings from becoming excessively large. As a result the wire used to wind each of the coils 12 and 13 is double enamel insulated which is found to be sufficient insulation for the operation of motors like that shown in Figs. 1 and 2 on 6 and 110 volt circuits. No fish paper or similar insulating material is required to separate different layers of wire in the winding for insulating purposes and as a result of the elimination of excess insulating material an efficient coil winding is produced of a substantially reduced size, at the same time obtaining effective magnetization of the core when it is energized.

Low voltage winding 12 has one terminal thereof as shown in Fig. 1 electrically connected by a circuit connection 15 to one of the contact points 9. This circuit connection 15 is obtained by connecting one end of the wire forming winding 12 to a metal clip 15' having one end attached to supporting bracket 11 as shown in Fig. 1, and the opposite end attached to core 1 to provide a ground connection indicated at 16 in the diagrammatic view, Fig. 7.

The other end of the winding forming coil 12 is electrically connected by attaching a wire to terminal post 17 carried by terminal block 18. The wire connection is indicated in Figs. 1, 2 and 7 at 19.

Coil winding 13 has the wire at one end thereof electrically connected to the contact points 9 illustrated at the left hand side of Fig. 1 as indicated by the numeral 20 in Fig. 7, while 21 in Fig. 1 illustrates the end of the wire and how it is physically connected to the lead 22 of resistor 23. Resistor 23 is connected at one end by means of lead 22 forming the circuit connection 20 of Fig. 7 to a bracket 11. Circuit connection 24 of Fig. 7 is formed by means of lead 25 shown in Fig. 1 to which one end of coil 13 is connected. Lead 25 forming circuit connection 24 of Fig. 7 is suitably connected to contact terminal 26 carried by terminal block 18. This interposes resistance 23 in circuit with coil winding 13 so that it is shunted across said coil winding 13.

It will be noted that coil windings 12 and 13 and their circuit connections with contact points 9 and terminals 17 and 26, is a series circuit arranged so that separation of contacts 9 will break the circuit.

A circuit connection 27 is extended from circuit 20 or directly from contact point 9 at the left hand side of Figs. 1 and 7, so as to by-pass coil 13 and resistance 23 by connection with terminal 28 carried by terminal block 18. This provides a series circuit between terminals 17 and 28 that will include voltage coil 12 and contact points 9 in series with a current supply circuit connected to terminals 17 and 28. This circuit connection to terminals 17 and 28 provides the low voltage circuit for the operation of the motor on low voltages such as voltages ranging from 6 to 24 volts. This circuit arrangement is particularly adapted for the construction and operation of the motor on a 6 volt source of current supply which may be either direct, pulsating or alternating current.

The circuit including coil windings 12 and 13 in series with contact points 9 is connected to terminals 17 and 26 and provides a series circuit through both coil windings and contacts for securing operation of the motor on high voltages such as those ranging from 110 to 120 volts.

A condenser of suitable value indicated at 30 is connected across contact points 9 by having the terminals thereof connected to brackets 11 supporting contacts 9 in the manner illustrated in Fig. 1. The condenser is located adjacent to the coil windings and between the arms of the U-shaped core which is illustrated in Fig. 1 for compactness in construction. This condenser has a suitable capacity for cooperation in the circuit including the coil windings 12 and 13 to reduce arcing at the points 9 as they are separated by momentarily receiving some of the current from the coils generated at the time the contacts 9 are opened. A second condenser 31 having a desired capacity is connected across the circuits 19 and 24 as shown in Figs. 1 and 7. This circuit connection is located across the opposite ends of coil windings 12 and 13 from condenser 30, as shown in Fig. 1, so that it is positioned between the coils and terminal block 18. It will be noted that this second condenser 31 is connected across the current supply line to coils 12 and 13.

It has been found in the construction and operation of a shaver motor in the manner described above and shown in Figs. 1 to 3 and 7, that it will operate at high speed on either low voltage current supply circuits or high voltage supply circuits of the character referred to above to secure the efficient operation of the shaver. This motor is found to have increased power over previous similar types of motors due to the particular arrangement of condensers 30 and 31 and resistance 23 in the circuit with coils 12 and 13 and contacts 9.

In operating the motor on low voltage with the circuit through high voltage winding 13 open, the induced current in winding 13 is of sufficiently high voltage to break down the double enamel insulation used on the wire and cause short circuits between the coil and layers in winding 13. By shunting resistance 23 of high ohmic value across winding 13 a circuit is closed through winding 13 during low voltage operation having less resistance than the insulation thereby providing for the flow of induced current at high voltage through the entire coil and the resistance. This results in eliminating the insulation break down and arcing and utilizes the induced current for increasing the magnetic flux. It has also been found that this resistance 23 and condensers 30 and 31 cooperate in such a way that the power in the motor is increased in both low and high voltage operation thereof, that arcing across the points is maintained at a minimum so as to reduce and substantially eliminate excessive burning of the points and pitting or corrosion thereof.

This circuit arrangement is also found to effectively eliminate within the motor circuit, interference which heretofore produced undesirable noises in adjacent radio receivers and radio receivers connected in the current supply circuit to the shaver. The ground connection 16 on core 1 Fig. 7 in conjunction with condensers 30 and 31 is found to effectively cooperate in radio interference elimination as well as spark reduction at contact points 9, and production of increased efficiency in motor operation and power output. The shaver heads operated by motors as herein described are provided with suitable insulation to eliminate static effects and shock from the motor circuit to ground in view of the ground connection to the core.

Figure 5:
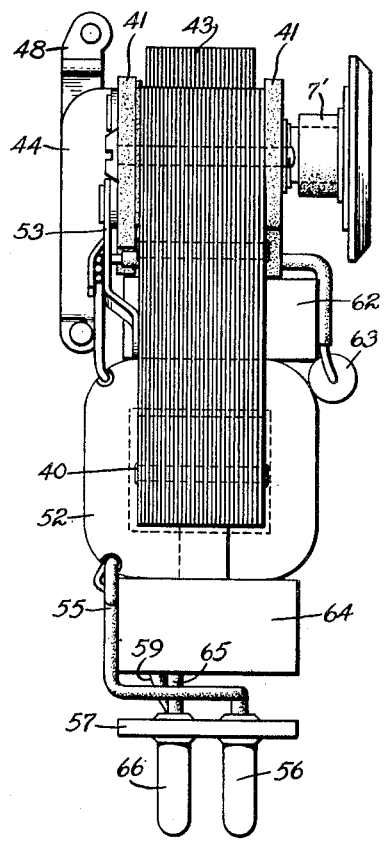
Fig. 5 is a side elevation of the motor illustrated in Fig. 4.
Figure 6:
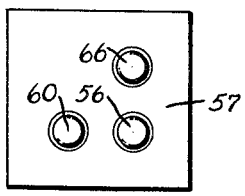
Fig. 6 is an end view of the terminal block showing the arrangement of contacts thereon for the motor shown in Figs. 4 and 5.

In Figs. 4 to 6 inclusive a multiple voltage motor construction is disclosed that in most respects is substantially identical with the motor disclosed in Figs. 1 to 3. Like the structure shown in Figs. 1 to 3 the motor illustrated in Figs. 4 to 6 inclusive includes a similar magnetizable core 40 formed of a plurality of laminations suitably secured together. Bearing plates 41 are attached to opposite sides of the free ends of U-shaped core 40 and carry bearing members that rotatably support shaft 42 carrying armature 43. Contact supporting brackets 44 are mounted on one of the bearing plates 41 as illustrated in Fig. 4. Each contact supporting bracket 44 carries a spring arm member 45.

Suitable cam engaging plates 46 are mounted on the free ends of resilient arm members 45 for engagement with operating cam 47 carried by shaft 42. Contact supporting arms 48 are attached to the free ends of spring arm members 45 in the manner shown in Fig. 4, by suitable rivets or the like. This structure is substantially the same as that shown in Fig. 1 except that the free ends of spring arm members 45 do not extend into engagement with contact points 49. The contact supporting arms 48 carry contacts 49 and are of different construction than the corresponding parts of the structure shown in Fig. 1. In the structure shown in Figs. 4 and 5 the contact supporting arms 48 are constructed of thermally responsive material so formed that when heated the arms will bend to disengage contact points 49 from each other in all positions of cam 47 and thereby render the motor inoperative.

These contact supporting arms 48 are preferably constructed of two different metals in the form of two strips extending lengthwise of the supporting arms 48. The two strips are secured together so that whenever excessive currents are conducted by the bi-metal structure, heating of one of the elements will be caused creating a difference between the expansion of one strip of metal relative to the other through different coefficients of expansion of the two strips of metal. This causes the ends supporting contact points 49 to be moved outwardly away from the opposed contact point for disengaging the points.

Two windings are mounted on core 40, one a low voltage winding 50 and the other a high voltage winding 51. These windings are mounted on two adjacent sections of spool 52 having end flanges and encircling core 40 in a well-known manner. For this type of dual voltage motor low voltage winding 50 is for electrically energizing the core and is constructed to operate for example on 110 volts while the high voltage winding 51 is wound and designed to operate on 220 volts. Variations in these voltages for the designs of the coils 50 and 51 may be made so that low voltage winding 50 may be designed to operate on voltages up to 125 or 130 volts while high voltage winding 51 may be designed to operate on voltages up to 250 volts. This is by way of example only and other relationships between the low and high voltage windings may be made to suit such conditions of operation or current supply circuit as necessity may require. Windings 50 and 51 are in all substantial respects similar to the windings for the low and high voltage cores illustrated in Fig. 1.

The low voltage winding has one end thereof connected to a clip 53 attached to the righthand contact supporting bracket 44 at one end. Clip 53 has the opposite end secured to core 40. This provides a circuit 54 indicated in Fig. 9 with one contact point 49. The opposite end of low voltage winding 50 is connected by a circuit connection 55 to terminal 56 carried by terminal block 57.

One terminal of high voltage winding 51 is connected by a circuit wire 58 to the other contact point 49 opposite the one to which wire 50 and circuit connection 54 is made. This connection is obtained by securing one end of the winding to a clip carried by and in circuit with bracket 44 at the left-hand side of the motor, as illustrated in Fig. 4. The opposite end of high voltage winding 51 is connected by a circuit wire connection 59 to contact 60 on terminal block 57. This provides a circuit through both windings 50 and 51 and contact points 49 so that they may be connected in circuit with a 220 volt current supply for the use of both coil windings in operation of the shaver on a 220 volt current supply.

The clip 53 in being secured to core 40 provides the ground connection indicated in Fig. 9 at 61. A condenser 62 is connected across contact points 49 by having its opposite terminals connected to circuit connections 54 and 58, respectively. A suitable resistor 63 is connected across contact points 49 to circuit connection 54 and 58 as shown in Fig. 9 and cooperates with condenser 62 in reducing arcing across points 49 as they are opened in the operation of a shaver. At the opposite side of coils 50 and 51 a second condenser 64 of suitable capacity is connected across the series circuit through the windings 50 and 51 when operated on a high voltage by having the terminals connected with circuit wires 55 and 59 respectively, as shown in Fig. 9. This condenser 64 cooperates with resistor 63 and condenser 62 in reducing arcing at contact points 49 when opened, and in addition cooperates in eliminating radio interference in the operation of said motor along with the cooperation obtained by ground connection 61 with core 40 of the motor.

A by-pass circuit connection 65 is made with contact 49 at the left-hand side of the motor as illustrated in Fig. 4 and a terminal 66 on terminal block 57. This by-pass circuit connection 65 provides a series circuit between terminals 56 and 66 including low voltage coil 50 and contacts 49 so that the motor may be operated on low voltage current supply which may be approximately 110 volts.

In the operation of the motor as disclosed in Figs. 4 to 6 and 9, the condensers 62 and 64 along with ground connection 61 and resistor 63 cooperate to secure the reduction of arcing at the points to a minimum so as to avoid burning, pitting and corrosion of the points, to provide radio interference elimination built in the motor and at the same time eliminate excessive voltages induced in the motor during operation thereof particularly following the opening of contact points 49, so as to avoid arcing across the circuit at any point or a breakdown in the insulation in the circuit when operating on either low voltage supply circuits or high voltage supply circuits of the character for which the coils 50 and 51 are designed and as stated above being for operation on approximately 110 and 220 volts, respectively. It will be understood, however, that in operation on 220 volts that both coils 50 and 51 are employed in operation of the motor in a series circuit arrangement as illustrated in Fig. 9 and as above described.

In connection with the motors shown in Figs. 1 and 4 respectively, Figs. 8 and 8A, and 10 and 10A respectively, illustrate the attachment cords used for connecting these motors in the respective current supply circuits. In Figs. 8 and 8A two different attachment cords are illustrated. Cord 70 of Fig. 8 has an attachment plug 71 on one end thereof provided with three holes arranged in the same spaced relation as contacts 17, 26 and 28 of the motor shown in Figs. 1 and 7. It will be noted that plug 71 is provided with two contact sleeves 72 and 73 connected to two independent wires in the connecting cord having the opposite ends attached to two contacts in attachment plug 74 of the conventional form commonly used in connection with automobile current supply systems so that it can be inserted in a lamp socket or the like on an automobile current supply circuit to secure operation of the shaver shown in Fig. 1 on a six volt source of direct current supply. In attaching plug 71 to the shaver it will be noted that it can be inserted into engagement with the contacts carried by terminal block 18 in only one position, this position being such that electric circuit will be made with contacts 17 and 28 and sleeves 72 and 73 while an opening is provided in plug 71 to receive contact 26 but no circuit will be made therewith because such opening is not provided with a contact sleeve.

When it is desired to operate the motor shown in Figs. 1 and 7 on the high voltage current supply, another attachment cord 75 Fig. 8A, is necessary, having a plug 76 on the end thereof constructed in exactly the same manner as pulg 71 with the exception that contact sleeves 77 and 78 therein are arranged so that they will have electrical engagement with contacts 17 and 26 respectively, on terminal block 18 of the shaver. The opposite end of connecting cord 75 carries a standard attachment plug for engagement in a plug receptacle of a conventional 110 volt source of either direct or alternating current supply such as found in homes, offices and other similar places.

With the two sets of connecting cords having plugs 71 and 76 respectively constructed as shown in Figs. 8 and 8A, it will be clear that these plugs can only be inserted into the shaver for engagement with the contacts carried by the terminal block in one position. In the position with which either plug may be engaged with the contacts on the terminal block of the shaver, the shaver can be operated on only one voltage and in this way the motor windings are protected against connection in a circuit having excessive voltage particularly where the low voltage coil is connected in circuit. This is due to the fact that the plugs on connecting cords 70 and 75 have a different arrangement of contact sleeves, as shown. It would be normally difficult to connect the low voltage coil of the shaver to a high voltage supply because where standard conventional plugs are used on cords 70 and 75, such as plug 74 for example, these plugs have different structure and prong arrangements so they would not fit conventional current supply receptacles for the two voltages.

Wherever such a possibility may exist it will be understood that in order to protect the low voltage winding the thermally responsive contact supporting arms 48, as shown in Fig. 4, may be used in place of the corresponding contact supporting arms as shown in Fig. 1 so that by this means the excessive current on the low voltage coil would operate to disengage contact points 9 and operate to prevent overheating of low voltage winding 12 and burning of the insulation thereon. It will be understood in this connection with reference to the structures disclosed in both Figs. 1 and 4 that wherever the low voltage winding is accidentally plugged into a high voltage supply circuit, the motor will operate momentarily until the contacts become heated which is found to occur within a few seconds after the motor is plugged into the circuit. The operation of the thermally responsive contact supporting arms is sufficiently rapid to open the circuit between the contact points in sufficient time to prevent destruction of the low voltage coil. Operation of these thermally responsive contact supporting arms will obviously stop the operation of the motor until the contact supporting arms cool off, it being understood that the user of the shaver motor so constructed will pull out the plug from the current supply source after the motor stops and before the contacts re-engage.

In Figs. 10 and 10A the current supply cord is constructed similar to the cord 75, and only one cord is used. This current supply cord is indicated by the numeral 80. In Fig. 10 the cord is shown in one position as carrying a plug 81 having four sockets. Two sockets on one side are provided with contact sleeves 82 and 83 respectively, positioned so that when plug 81 is engaged with the contacts on terminal blocks 57, sleeves 82 and 83 will engage contacts 60 and 56 respectively. A conventional attachment plug 84 is attached to the opposite end of connecting cord 80 and is shown in the illustration of the connecting cord in Fig. 10A. This plug 84 is used to engage in a suitable receptacle for 220 volt supply of current when the motor is to be operated on this high voltage. When plug 81 is attached to terminal block 57 with contact sleeves 82 and 83 engaged with contacts 60 and 56 respectively, as above described, plug 81 will be in the approximate position shown in Fig. 10 with respect to the illustration of terminal block 57 in Fig. 9 just above the illustration of plug 81 (Fig. 10).

If it is desired to connect the motor in a low voltage supply circuit such as 110 volts, plug 81 is pulled out and rotated to a position at right angles to that shown in Fig. 10 into the position shown in Fig. 10A. Rotation of plug 81 to the right angular position as illustrated in Fig. 10A will position sleeves 82 and 83 so that they will engage contacts 56 and 66 respectively. When engaged with terminal block 57 in this position as disclosed by the position of terminal block 57 in Fig. 9 just above plug 81 Fig. 10A, the motor may be connected with a source of 110 volt current supply by inserting plug 84 in a suitable conventional receptacle for such a current supply source in a manner well-known.

It will be understood from the disclosure in Figs. 10 and 10A that the use of only one attachment cord 80 with a plug 81 adapted for use in two positions as illustrated, will permit careless users of a shaver with such an attachment plug to accidentally connect low voltage coil winging 50 in circuit with a high voltage supply source. This will cause excessive current to flow through coil 50, contact points 49 and thermally responsive contact supporting arms 48. As a result, the arms will become heated rather rapidly and sufficiently prior to the time when damage may be done to coil windings 50 and the insulation thereon. Thermally responsive contact supporting arms 48 will, therefore, disengage contacts 49 after a short period of operation of the motor on a high voltage supply circuit and disengage the contacts to stop the motor and protect the same against damage of the low voltage circuit through connection with the high voltage supply source.

The user of the shaver will obviously have to quickly disconnect the shaver motor from the high voltage supply source and change the position of plug 81 in its engagement with terminal block 57. In this manner the motor is protected against damage from the application of excessive voltages to either the low or high voltage circuits thereof.

Fig. 11 illustrates a diagrammatic view of a motor constructed in the same manner as the motors shown in Figs. 1 and 4. The motor is provided with a core 90 similar in construction to cores 1 and 40 which carries suitable bearing plates, not illustrated, for rotatably mounting armature 91 in the manner above disclosed, and carrying a cam member operated in the rotation of the motor for engaging and disconnecting contacts 92 mounted on the motor in the same manner as the contacts shown in Figs. 1 and 4, it being understood that either form of construction may be used in the motor as illustrated in Fig. 11. Instead of having two coil windings as in the constructions disclosed in Figs. 1 and 4, the motor as shown in Fig. 11 has a single coil winding 93 shown diagrammatically and adapted for operation on any desired voltage, for example, such as the usual 110 volt circuit generally found in officers, homes, and the like, or any of the other voltages herein above mentioned.

One end of coil winding 93 is connected by a circuit connection 94 to one of the contact points 92, while the other contact point is connected by circuit 95 so that it may be attached to a suitable current supply circuit through the medium of an attachment plug such as previously described. The other end of coil winding 93 is provided with a circuit connection 96 for attachment to the opposite side of a current supply line from circuit connection 95 to thereby include coil 93 in series in circuit with a source of current supply with contacts 92. This obviously provides an electric circuit whereby contacts 92 in the operation of armature 91 will be alternately opened and closed to make and break the circuit and secure the rotation of the armature in a manner well-known in the art in this type of motor. Circuit connection 95 has a ground connection 97 with core 90 as shown in Fig. 11. A condenser 98 is connected across contact points 92 to circuit connections 94 and 95 respectively while a second condenser 99 is suitably connected across the circuit between circuit connections 95 and 96 respectively as shown in Fig. 11.

The circuit arrangement as shown in Fig. 11 with condensers 98 and 99 and ground connection 97 provides an effective means for reducing sparking at the contact points 92 when opened so that excessive heating, burning or corrosion of the points is reduced to a minimum. At the same time the power generated by the motor is increased and interference with adjacent radio apparatus is eliminated. This is due to the co-operation of the condensers 98 and 99 as well as ground connection 97. This same result occurs in connection with the motors shown in Figs. 1 and 4 and as illustrated in diagrammatic illustrations Figs. 7 and 9. As above explained resistance 63 adds further protection in the dual voltage motors and may be used in the circuit in Fig. 11 if desired as well as in the circuit shown in Fig. 7 although it is found ordinarily that this use of resistance 63 is not necessary in the motors shown in Figs. 1 and 11 operating on the voltages as above described.

This increase in power with the reduction of arcing at the contact points to a minimum and radio interference elimination with protection of the coil insulation although at a minimum, provides for the construction of a motor that is small in size in comparison with the power developed so that it can be utilized to operate multiple head shaver structures and other similar apparatus, particularly where it is desirable to house the motor in a small casing that may be conveniently held in one's hand during use of the apparatus operated by the motor.

It will be understood that with the present invention, each of the motors will be used in a shaver or other apparatus in such a way that there will be insulation between the metal parts of the motor and the sheaver heads or other apparatus to prevent grounding and short circuiting as well as static effects that might result due to the use of the motor core as a ground in the motor circuit. In the shavers in which these motors are used an insulating roller 7' secures this result, as indicated in Figs. 2 and 5.

The invention claimed is:

1. A shaver motor comprising a magnetizable core formed to provide spaced poles, an armature rotatably mounted in operative relation with respect to said poles, contacts having make and break therebetween controlled and operated by said armature, high and low voltage windings on said core having series circuit connection with each other and said contacts, a resistor shunted across said high voltage winding, a low voltage circuit having said contacts and low voltage winding in series and excluding said resistor and high voltage winding and a condenser connected in said circuit across said contacts whereby when said motor is operated on a low voltage current supply through said low voltage circuit connecting said low voltage winding and contacts in series therewith independent of said high voltage winding, whereby the power of said motor is increased, arcing at said contacts is reduced and arcing and breakdown in said high voltage winding is eliminated by the cooperation of said resistor and condenser in said circuit.

2. A shaver motor comprising a magnetizable core formed to provide spaced poles, an armature rotatably mounted in operative relation with respect to said poles, contacts having make and break therebetween controlled and operated by said armature, high and low voltage windings on said core having series circuit connection with said contacts, a protective resistor shunted across said high voltage winding, a condenser connected in circuit across said contacts, circuit connections with said high and low voltage windings for selectively connecting said motor with a low voltage supply source and a high voltage supply source, said high voltage winding being separate from the circuit to said low voltage winding when connected with said low voltage supply source, and a second condenser connected across the circuits to said high and low voltage windings to said supply source whereby arcing at said contact points is reduced in the operation of said motor on all voltages and breakdown of insulation in said high voltage winding is eliminated when said motor is operated from a low voltage supply source by the cooperation of said protective resistor and condensers in said circuits.

3. A shaver motor comprising a magnetizable core formed to provide spaced poles, an armature rotatably mounted in operative relation with respect to said poles, contacts having make and break therebetween controlled and operated by said armature, high and low voltage windings on said core having series circuit connection with said contacts, a condenser connected in said circuit across said contacts and at one of the ends of said windings, a second condenser connected across said circuit at the opposite ends of said windings, a ground connection in said circuit between said low voltage winding and said contacts connected with said core, and additional circuit means connected with said windings and contacts for connecting said low voltage winding and contacts in series with a low voltage source of current supply and for selectively connecting both of said windings and contacts in series with a high voltage source of current supply for operation of said motor on both high and low voltages whereby said condensers and ground connection reduce arcing at said contacts, eliminate radio interference in the operation of said motor and improve the operation and increase the power produced by said motor.

4. A shaver motor comprising a magnetizable core formed to provide spaced poles, an armature rotatably mounted in operative relation with respect to said poles, contacts having make and break therebetween controlled and operated by said armature, high and low voltage windings on said core having series circuit connection with said contacts, a condenser connected in said circuit across said contacts and at one of the ends of said windings, a second condenser connected across said circuit at the opposite ends of said windings, a ground connection in said circuit between said low voltage winding and said contacts connected with said core, a resistance in said circuit for by-passing current in said coils, and additional circuit means connected with said windings and contacts for connecting said low voltage winding and contacts in series with a low voltage source of current supply and for selectively connecting both of said windings and contacts in series with a high voltage source of current supply for operation of said motor on both high and low voltages whereby said condensers and ground connection and resistance reduce arcing at said contacts, eliminate radio interference in the operation of said motor and improve the operation and power produced by said motor.

5. A shaver motor comprising a magnetizable core formed to provide spaced poles, an armature rotatably mounted in operative relation with respect to said poles, contacts having make and break therebetween controlled and operated by said armature, a coil winding on said core having series circuit connection with said contacts, said series circuit having a direct circuit connection with said core between said coil winding and said contacts, a condenser connected in said circuit across said contacts and a second condenser connected in said circuit across said coil and contacts whereby said condensers and ground connection cooperate in the operation of said motor to reduce arcing across said contacts and elimniate radio interference with improved motor operation.

6. A shaver motor comprising a magnetizable core formed to provide spaced poles, an armature rotatably mounted in operative relation with respect to said poles, contacts for making and breaking a circuit, a plurality of coil windings on said core having series circuit connection with said contacts, an arm for supporting each contact, at least one of said arms formed for thermal actuation thereof by excessive current in said arm for disconnecting said contacts from normal operation, means for normally operating said arms to make and break the connection between said contacts in the operation of said armature for controlling the circuit to said coil windings, and means for suppressing arcing across said contact points.

7. A shaver motor comprising a magnetizable core formed to provide spaced poles, an armature rotatably mounted in operative relation with respect to said poles, contacts having make and break therebetween controlled and operated by said armature, a plurality of windings on said core having series circuit connection with said contacts, a plurality of arms one for supporting each contact, at least one of said arms being formed of bi-metallic thermally responsive material independently operable to disengage said contacts upon the application of abnormal voltages to said coil windings, and means for suppressing arcing at said contacts.

EDGAR S. TOLMIE.